June 30, 1964  W. H. B. HOFF  3,139,124
SWINGABLE MOUNT FOR POWER SAWS
Filed Sept. 28, 1962  2 Sheets-Sheet 1

INVENTOR.
William H. B. Hoff
BY
Bertram H. Mann
ATTORNEY

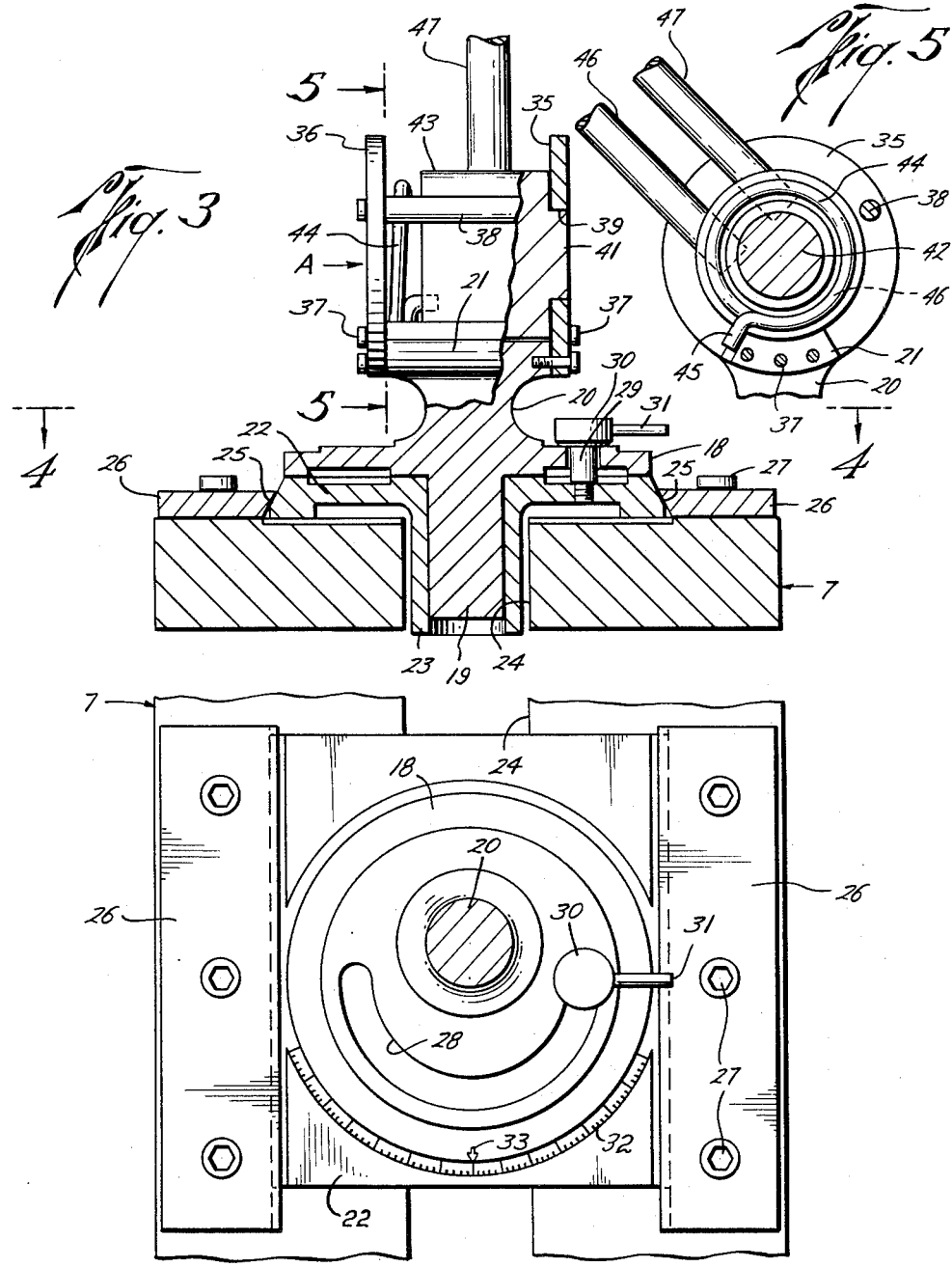

United States Patent Office 3,139,124
Patented June 30, 1964

3,139,124
SWINGABLE MOUNT FOR POWER SAWS
William H. B. Hoff, 204 S. Crescent Drive, Victoria, Tex.
Filed Sept. 28, 1962, Ser. No. 226,835
6 Claims. (Cl. 143—6)

This invention relates to power saws and consists particularly in novel means for supporting and guiding such a saw in performing various woodworking, metal and plastic cutting operations.

Homebuilders, particularly small contractors who customarily build one or two residences at a time, customarily are equipped with at least two electrically-powered, portable hand saws and one radial or table saw. The latter saws, which are used for angled and ripping operations, are relatively heavy and expensive so that, usually, a builder is equipped with only a single such tool which is left in a single location to which carpenters must bring their work. Furthermore, a certain amount of skill is required in using such heavy saws with the result that a workman may have to await his turn at the machine. Thus, substantial loss of time with resultant increased labor costs may result.

It is an object of the present invention to provide a relatively light, easily portable, inexpensive tool for performing the cutoff, mitering, and trimming operations customarily performed by a heavy, expensive radial or table saw.

Another object is to provide support means for a power saw which can be readily disassembled, as at the end of the day, for storage of the power tool in a safe place.

Another object is to provide a powered hand saw with support and guide means facilitating the making of accurate miter as well as rectangular cuts.

Still another object is to provide means for adapting a powered hand saw for performing all of the operations of the usual radial or table saw and one which is very much less expensive than the latter types of saws.

According to the present invention there is provided a flanged bearing or housing member for attachment to a work table. This member has a vertical bearing sleeve or collar in which is rotatably received a spindle at the top of which there is provided an elbow type mount adapted for attachment of a powered hand saw. At the elbow of the mount there is provided a torsion spring which normally maintains the mount and carried saw in an elevated position. The operator, standing before the table and mount, grasps the saw, which is suitably secured to the swinging end of the mount, and lowers it against the work for making a cut. The support arm may be rotated about the mentioned spindle to vary the angle of cut and suitable guiding and indexing means are provided on the mount and work table to aid in angling the cut as desired. Preferably, the housing member may be slid along or across the table for increasing the length of the cut.

In the accompanying drawings which illustrate the invention,

FIG. 3 is a vertical transverse section through certain of the mounting parts;

FIG. 4 is a horizontal section taken substantially on line 4—4 of FIG. 3; and

FIG. 5 is a section on line 5—5 of FIG. 3.

Figure 1:
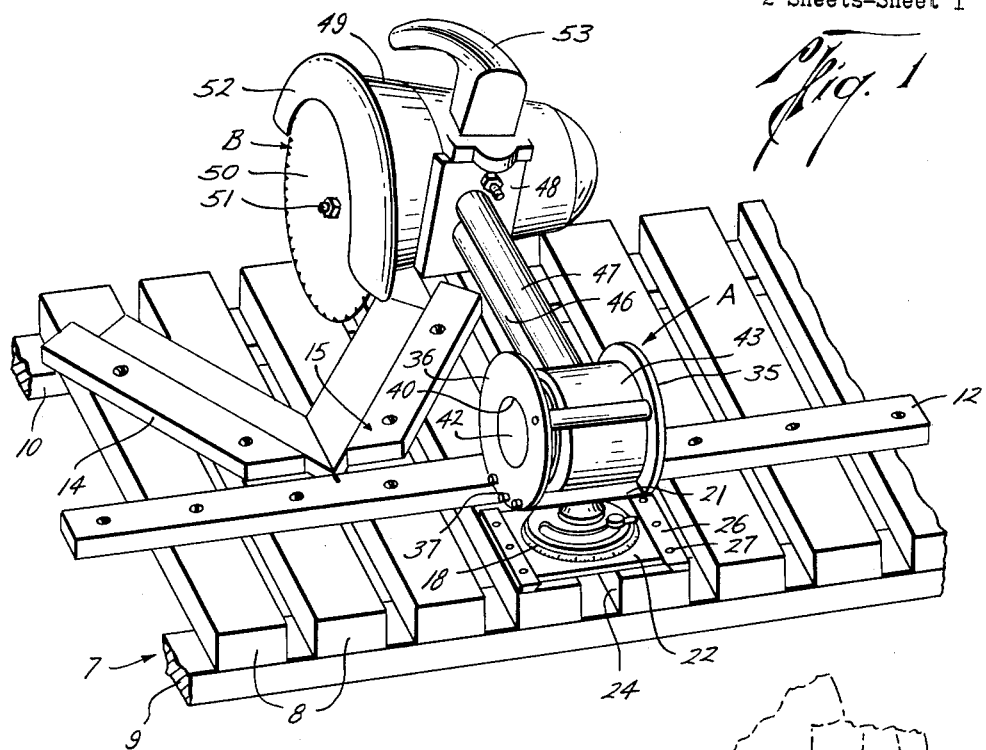
FIG. 1 is an isometric view of the novel power saw mount viewed from the back of the work table.
Figure 2:
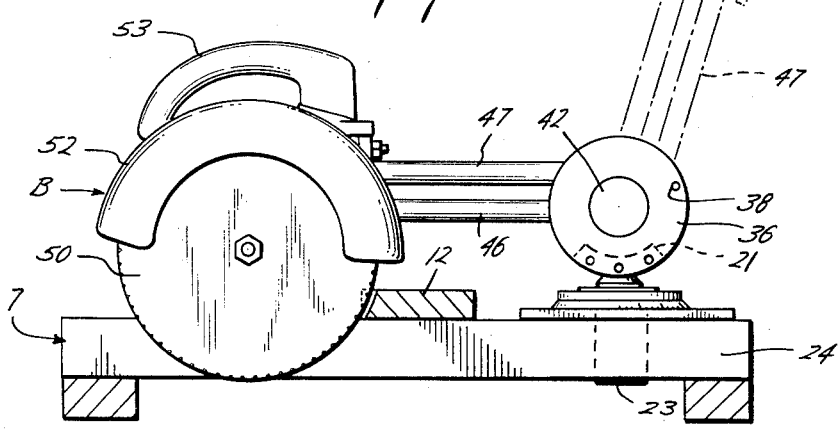
FIG. 2 is a side view of the mount and saw.

The novel tool is shown mounted upon a work table 7, in this case built up of spaced transverse and longitudinal boards 8, 9, and 10 of sufficiently heavy stock and bolted together. The table may rest on saw horses or any other suitable support (not shown) and, preferably, is portable. A longitudinal guide bar 12 extends along the table and is spaced from table rear edge sufficiently to accommodate the mount, as will be explained. The table, also, may be provided with mitering guides 14 and 15.

Resting on the top of table 7 near the rear edge thereof, is the novel mount A to which is secured a powered hand saw B. The mount A consists of a pedestal member, conveniently a casting, including a circular bottom plate 18 with a depending axial spindle 19 (FIG. 3), and an upstanding part 20 surmounted by a sector piece 21. Plate 18 rotatably rests upon a base plate or flange 22 having a depending, axial bearing sleeve 23 snugly receiving spindle 19. Sleeve 23 is inserted in a space 24 between two of the transverse table boards 8, the space permitting transverse sliding of the mount on the table. Plate 22 is generally rectangular and has inclined side edges 25 confined between transverse guides 26 bolted to the table, as at 27. Guides 26 are arranged to lock the mount in position, transversely of the table, when and if desired.

Pedestal plate 18 is provided with a concentric slot 28 through which projects a locking bolt 29 having an enlarged head 30 overlying the edges of the slot. A handle pin 31 projects from head 30 and bolt 29 is threaded into plate 22 so that rotation of the bolt will frictionally tighten or release head 30 with respect to pedestal plate 18. Base plate 22 is provided with degree markings 32 adjacent the periphery of pedestal plate 18 (FIG. 4) along which moves an index point 33 on the pedestal plate for indicating the angular disposition of the mount. A pair of parallel bearing discs 35 and 36 (FIG. 3) are bolted at their lower edges, as at 37, to the sides of sector piece 21 and are braced near their outer edges by a crossbolt 38. These discs, forming a clevis, have aligned openings 39 and 40 in which rotate lateral journal projections 41 and 42 on a generally cylindrical knee joint member 43. The periphery of member 43 is concentric with and slightly spaced from sector piece 21. A heavy torsion spring 44 is received about journal projection 42 (FIG. 5) between disc 36 and the adjacent end of member 43. One end 45 of this spring overlies an end of sector piece 21 (FIG. 5) while the other end 46 of the spring is inserted in an opening in the end of knee member 43 (FIG. 4). Thus, spring 44 resists relative rotation of member 43 and bearing discs 35 and 36.

Projecting radially from knee member 43 are a pair of fairly heavy bars 46 and 47 at the free ends of which there is provided a bracket plate 48. Bolted to plate 48 is the powered hand saw B of commercial make, including an electric motor 49 to which are connected powering wires (not shown) and mounting a circular saw 50 on its power shaft 51. A guard 52 extends over the saw blade. Certain powered hand saws now available have a pad positioned for attachment to bracket plate 48. Others may need an interposed adapter. A handle 53 projects upwardly from the motor.

In the use of the novel tool, the work table is first set up at the desired location convenient to the workmen. Base plate 22 is secured in position between guides 26, a space 24 being provided between the attached boards 8 to freely accommodate some lateral play of sleeve 23. With saw B mounted on bracket 48 of the mount A, spindle 19 of the pedestal is dropped into sleeve 23 and plate 18 rested upon the upper surface of base plate 22. Locking bolt 29 is then inserted through slot 28 and threaded into plate 22. With the bolt loosened, the mount is rotated to the desired angle of operation and the bolt is then tightened by the use of handle 31. This causes frictional gripping between bolt head 30 and plate 18 to lock the saw mount so that an accurate cut can be made.

The operator then grasps handle 53 and depresses the saw against spring 44 to make the cut in a piece of wood, metal or plastic laid on the table against one of the guides 12, 14 or 15. Spring 44 is heavy enough to hold the saw and its mount elevated after the workman applies light lifting force to the saw.

In order to aid in positioning the saw, index markings 32 are provided on plate 22 for indicating, by reference to an index point 33 on pedestal plate 18, the angular position of the mount and saw about vertical pivot spindle 19. With index point 33 at the exact center of markings 32, the tool will be properly oriented with respect to guide 12 to make a right cut in a work piece held against longitudinal guide 12 or to make an angular cut in the wood, metal or plastic held against either of the mitering guides 14 or 15. If desired, angled cuts may be made in the material held against longitudinal guide 12 by rotation and relocking of the mount. If a longer cut is required, transverse guides 25 can be slightly loosened and the mount slid therealong transversely of the table.

At the end of the day it is a simple matter to lift the saw and its mount from the pivotal support and store these more valuable pieces in a safe place. However, the cost of the described equipment is substantially less than that of a conventional table or radial saw so that a financial saving in equipment costs is possible. Moreover, due to the easy portability of the equipment, it is convenient to move it about the job to the most accessible location. This is a great advantage over present types of table saws which cannot be easily moved about the job.

It is contemplated that all parts will be ruggedly and accurately constructed for heavy duty usage by professional builders or manufacturers of wood, metal or plastic items, as well as for use in the home workshop. Pedestal member 18, 19, 20, 21 may be constructed of an aluminum casting. Base member 22, 23 and bearing plates 35 and 36, preferably are of bronze bushing stock. Knee member 43 and bars 46 and 47 are made of aluminum bar stock, to reduce the weight of the movable structure. Also, radial support bars 46 and 47 may be replaced by an arm casting which might also include knee member 43 as well as bracket plate 48. The spindle member may be locked otherwise than by frictionally drawing together bolt head 30 and plate 18, as by a set screw arrangement threaded into sleeve 23 and engaging spindle 19.

This saw mount is portable, weighing approximately fifteen pounds, and is adaptable to seven, eight, and ten inch saws. It is attractively designed of rust-proof materials and is simple to operate, being quickly mounted or dismounted. It is extremely accurate and speedy in cut-off, mitering, and trimming operations and gives added power to the mounted hand saw. It provides an inexpensive, lightweight piece of equipment instead of the usual more expensive, heavy radial saw, thus saving labor time and costs. It will be useful to builders, cabinet makers, plumbing and glass store front contractors, aluminum extrusion, tubing, and plastic fabricators, maintenance shops, school and home workshops.

I claim:
1. A mount for a motor driven hand saw comprising a flanged sleeve for attachment to a work table top with the sleeve axis disposed vertically,
a pedestal part having a clevis with bearing openings in the arms thereof,
a knee joint journal extending in and between said openings and a spindle projecting at right angles to to the axis of said journal member for pivotal reception in said sleeve,
arm means projecting radially from said journal member and rotatable therewith,
bracket means at the free end of said arm means for attachment thereto of a power saw,
and torsion spring means stressed between said clevis and said journal member and normally biasing said arm means toward a rest position,
said pedestal part being rotatable about the vertical axis through said spindle for adjusting the cutting angle of a carried saw and said spindle being readily insertable in and detachable from said sleeve for mounting and dismounting said pedestal and the attached saw,
said arm means being swingable about the horizontal axis through said journal member for propelling the mounted saw to and from the work.

2. A mount for a motor driven hand saw comprising a flanged sleeve with a flat surface for attachment to a work table top with the sleeve axis vertical,
a pedestal part having a clevis with a journal member extending between the arms thereof and a spindle projecting at right angles to said member for swingable reception in said sleeve,
means for locking said pedestal part in the selected position,
arm means projecting radially from said journal member,
bracket means on the free end of said arm means for attachment of a power saw,
and spring means stressed between said pedestal part and said arm means and normally biasing said arm means away from the mounting table top,
said pedestal part and the attached saw being rotatable about the vertical axis through said sleeve and spindle for adjusting the angle of cutting and being lockable by said locking means in the selected cutting position,
and said arm means and saw being vertically rotatable about the axis of said journal member for propelling the saw to and from the work.

3. A power saw mount as described in claim 2 in which said locking means comprises confronting portions of said flanged sleeve and said pedestal part and a screw element threaded in one of said elements and abutting the other for varying the frictional engagement of saw portions.

4. A power saw mount as described in claim 2 in which said pedestal part further includes a radially projecting adjustable plate engageable with the flange on said flanged sleeve, and means for causing frictional engagement of said plate and flange for locking said clevis part relative to said flanged sleeve and the work table.

5. A power saw mount as described in claim 2 further including index means on said flanged sleeve for correlation with a right line on the work table and other index means on said pedestal part for positioning of the mounted saw with respect to the work table.

6. A power saw mount as described in claim 4 further including a curved slot in said plate and threaded means projecting through said slot and adapted to frictionally vary the engagement of said radial plate and said flange.

References Cited in the file of this patent
UNITED STATES PATENTS

| | | |
|---|---|---|
| 1,481,569 | Tannewitz | Jan. 22, 1924 |
| 1,528,536 | DeWalt | Mar. 3, 1925 |
| 1,638,122 | Jull | Aug. 9, 1927 |
| 1,867,275 | McCarter | July 12, 1932 |
| 2,372,699 | Wiken et al. | Apr. 3, 1945 |
| 2,596,524 | Bridwell | May 13, 1952 |
| 2,856,973 | Horton | Oct. 21, 1956 |